United States Patent [19]

Bonnes

[11] Patent Number: 4,831,815
[45] Date of Patent: May 23, 1989

[54] LAWN RAKE HEAD OF MOLDED SYNTHETIC RESIN COMPOSITION

[75] Inventor: David R. Bonnes, Westerville, Ohio

[73] Assignee: The Union Fork & Hoe Company, Columbus, Ohio

[21] Appl. No.: 132,930

[22] Filed: Dec. 15, 1987

[51] Int. Cl.[4] ............................................... A01D 7/06
[52] U.S. Cl. ............................... 56/400.17; 56/400.21
[58] Field of Search ........... 56/400.17, 400.18, 400.21, 56/400.16, 400.01

[56] References Cited

U.S. PATENT DOCUMENTS

| | | | |
|---|---|---|---|
| 1,970,616 | 8/1934 | Montan | 56/400.17 |
| 2,746,235 | 5/1956 | Kautenberg | 56/400.17 |
| 2,794,312 | 6/1957 | Finkes | 56/400.17 |
| 3,724,188 | 4/1973 | Eads | 56/400.17 |
| 4,215,528 | 8/1980 | Fodor | 56/400.17 |
| 4,219,993 | 9/1980 | Cosmos | 56/400.17 |
| 4,573,311 | 3/1986 | Fremh et al. | 56/400.17 |
| 4,667,458 | 5/1987 | Barrett | 56/400.17 |
| 4,744,208 | 5/1988 | King | 56/400.16 |

Primary Examiner—Paul J. Hirsch
Attorney, Agent, or Firm—Vorys, Sater, Seymour & Pease

[57] ABSTRACT

An integrally molded plastic lawn rake head features a frame section composed of a first, comparatively inexpensive, synthetic resin having a relatively low modulus of elasticity and a tine section composed of a second, comparatively tougher, more elastic and wear-resistant synthetic resin; the tine section having a root portion integrally molded in and securely interlocked in intimate contact with the frame section to preclude separation of the tine section from the frame section of the lawn rake head.

5 Claims, 3 Drawing Sheets

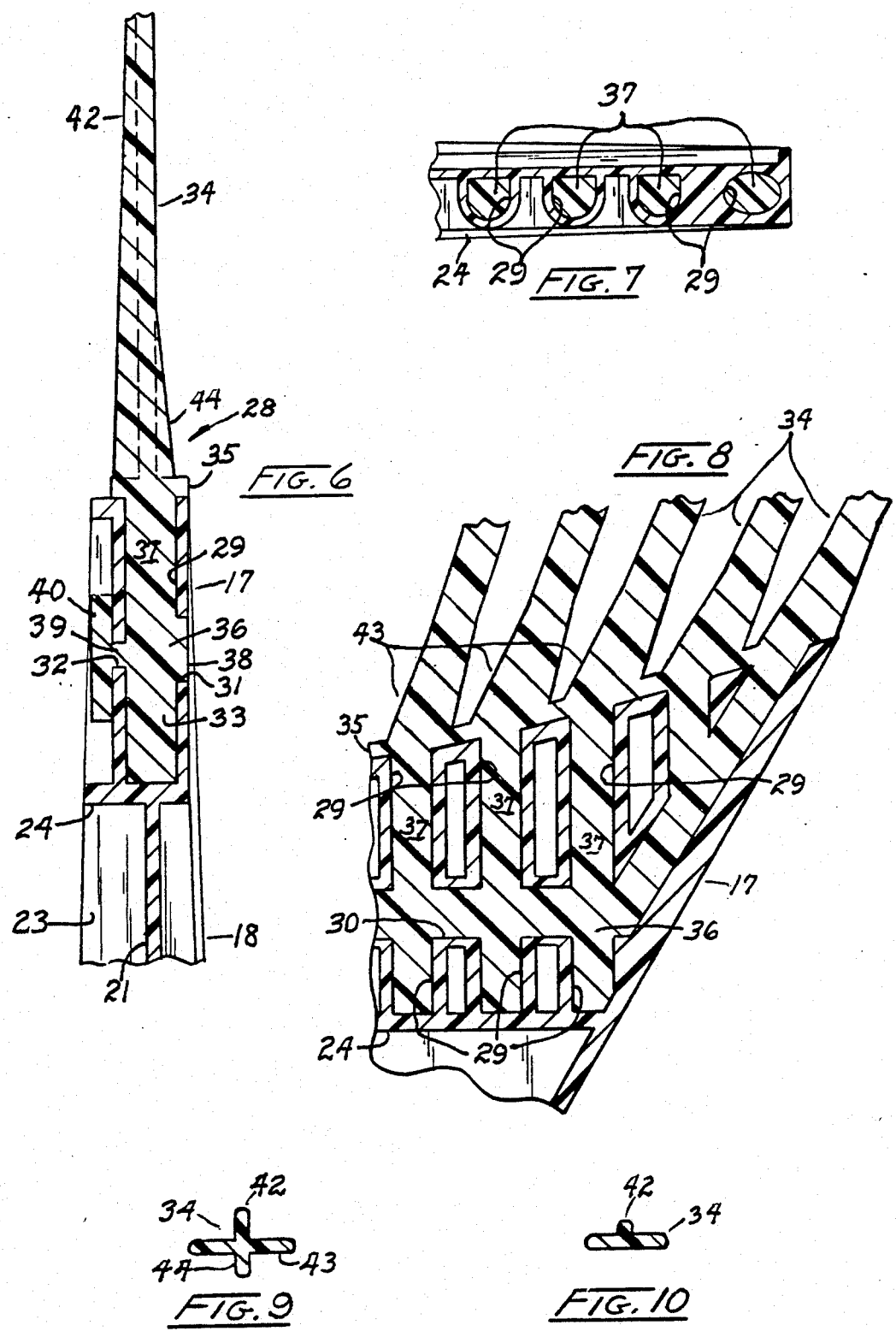

LAWN RAKE HEAD OF MOLDED SYNTHETIC RESIN COMPOSITION

BACKGROUND OF THE INVENTION:

This invention relates generally to the class of hand tools known commonly as lawn and/or leaf rakes. More specifically, the present invention is concerned with an improved molded plastic lawn rake head which includes a frame section composed of a first, synthetic resin and a tine section composed of a second, selected synthetic resin having physical properties differing from those of the first synthetic resin.

Molded plastic leaf or lawn rake tool heads of various designs and constructions have been available for purchase on the open market for many years. Typical of these molded plastic leaf rakes is one illustrated and described in U.S. Pat. No. 3,724,188 issued Apr. 3, 1973 to Eads (U.S. Cl. 56-400.17; Int. Cl. A01d 7/00) which proposes that the rake head be molded or formed in its entirety of polypropylene or like synthetic resin and which summarizes certain advantages of a molded plastic leaf rake head over the older steel or bamboo rake heads.

It has been found, however, that molded plastic leaf rake heads formed from, or composed of, a single thermoplastic resin, such as polypropylene, or polyethylene, while being comparatively inexpensive to manufacture, are lacking in certain physical characteristics or qualities, such as strength, durability, resiliency and eye appeal, which are desired by the average purchaser and user of lawn rakes. Furthermore, due to the comparative weakness of polypropylene and its low modulus of elasticity, the tines of a rake head formed therefrom must be relatively wide and thick to attain sufficient stiffness to enable them to function with any degree of efficiency.

SUMMARY AND OBJECTS OF THE INVENTION

The present invention provides an improved molded plastic lawn rake head which comprises an integral, generally fan-shaped frame section composed of a first, comparatively inexpensive, low modulus synthetic resin having a narrower end portion formed with a handle-receiving socket, an opposite, wider end portion formed with a multiplicity of longitudinally disposed, relatively spaced apart, outwardly opening sprue channels connected by a common, transversely disposed manifold chamber, a longitudinally tapered, thin-walled intermediate portion extending between and the end portions of said frame section and having a series of longitudinally extending stiffing ribs projecting outwardly from opposite faces thereof; and an integrally molded tine section composed of a second, comparatively tougher, more elastic, wear-resistant synthetic resin and having a root portion molded in and occupying the sprue channels and manifold chamber, and a multiplicity of elongated, resiliently flexible tines integrally connected with the root portion and extending longitudinally outwardly from the wider end portion of the frame section.

In a preferred embodiment of this invention, the manifold chamber formed in the wider end portion of the frame section includes a plurality of lateral passages opening on opposite faces of the frame section and the root portion of the tine section includes a plurality of integral, lateral projections extending through the lateral passages of the manifold chamber to interlock the tine section with the frame section of the rake head.

A principal object of this invention is to provide a molded plastic lawn rake head which possesses the resiliently flexibility and durability of a steel lawn rake head, but which is comparatively lighter and less expensive to manufacture and has considerably more eye appeal than the conventional steel lawn rake head.

Another object of the invention is to provide a molded plastic leaf rake head which includes a multiplicity of tines which are so formed and arranged as to render the rake head substantially self-cleaning in its normal operating mode.

A further object is to provide a molded plastic lawn rake head which may be fabricated in a conventional, two stage, insert injection molding process in which a fan-shaped frame section is first formed from a relatively inexpensive, low modulus synthetic resin having a selected coloration, and in which a tine section is subsequently formed of a second, stronger, stiffer and more durable synthetic resin having a color contrasting with that of the frame section. The two stage molding procedure provides integral joining of the tine section with the frame section without any clearance whatsoever.

These and other objects and advantages attendant to the present invention will become more readily apparent from the following description and the appended drawings.

BRIEF DESCRIPTION OF THE DRAWINGS

FIG. 6 is an enlarged, fragmentary sectional view taken approximately along the line 6—6 of FIG. 1;

FIG. 7 is an enlarged, fragmentary cross-sectional view taken along the line 7—7 of FIG. 1;

FIG. 8 is an enlarged, fragmentary, sectional view taken approximately along the line 8—8 of FIG. 2;

FIG. 9 is an enlarged, detailed sectional view taken along the line 9—9 of FIG. 2; and FIG. 10 is a similar view taken along the line 10-10 of FIG. 2.

DETAILED DESCRIPTION OF PREFERRED EMBODIMENT

Figure 1:
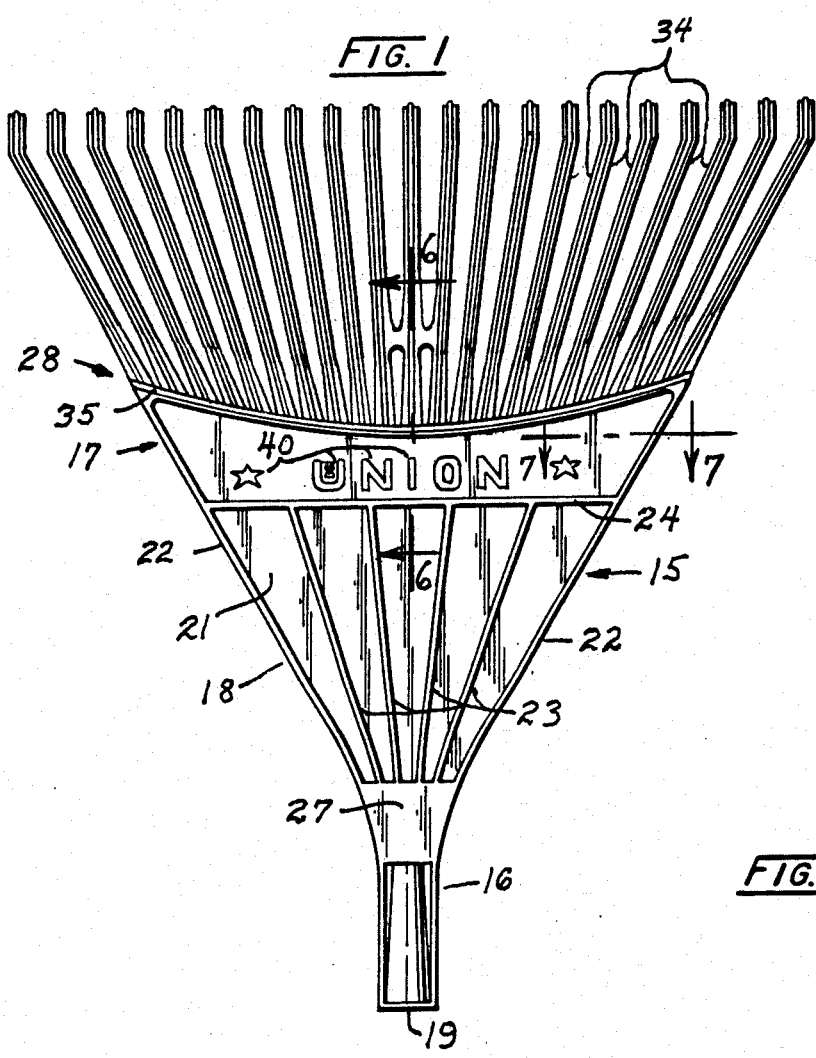
FIG. 1 is a top plan view of a plural resin, molded plastic lawn rake head according to the present invention.
Figure 2:
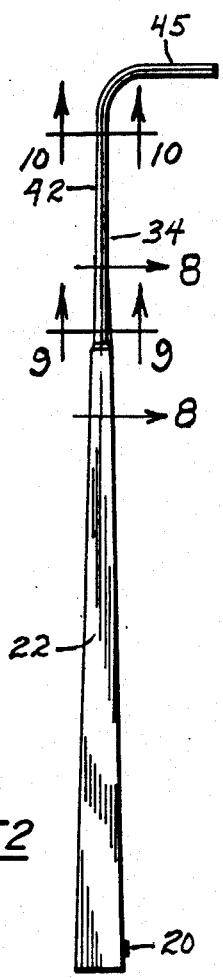
FIG. 2 is a side elevation view of the lawn rake head.
Figure 3:
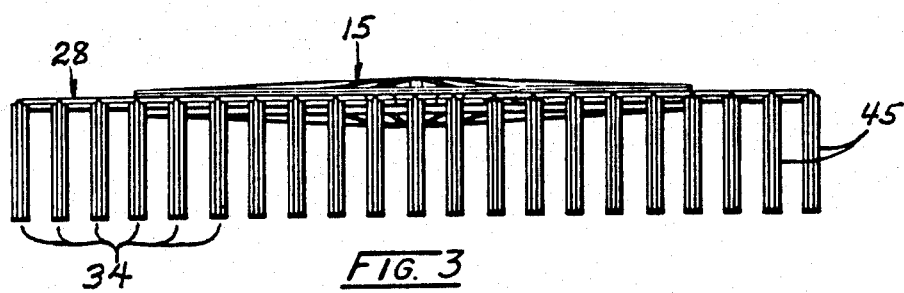
FIG. 3 is a forward end elevational view of the rake head.

With reference to the drawings, it will be seen that the present lawn rake comprises an integral, molded frame section 15 which is preferably composed of a readily available, inexpensive thermoplastic synthetic resin having a comparatively low modulus of elasticity, such as polypropylene, or polyethylene. The frame section 15 includes a relatively narrower end portion 16, an opposite, relatively wider end portion 17 and a longitudinally tapered, comparatively thin-walled intermediate portion 18 which extends between and integrally connects the opposite end portions 16 and 17 of the frame section 15. The narrower, butt end portion 16 is formed with a handle-connecting means preferably in the form of a tapered or screw-threaded socket 19. As will be understood, the socket 19 is arranged to receive a cooperatively tapered, or screw-threaded end portion of an elongated handle, not shown. The narrower end 16 of the frame is also preferably formed with a boss and coved hole socket 20 through which a locking screw or nail may be passed radially into the handle-receiving socket 19 to lock an associated handle member therein.

Figure 4:
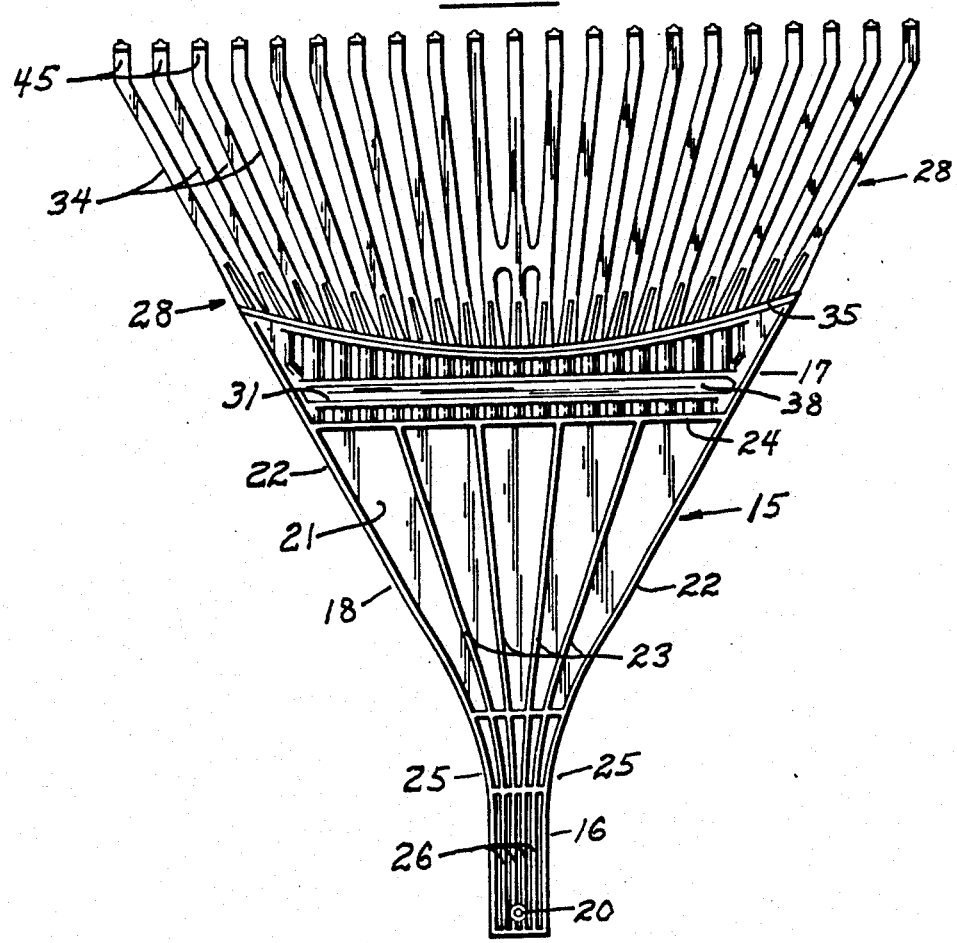
FIG. 4 is a bottom plan view.
Figure 5:
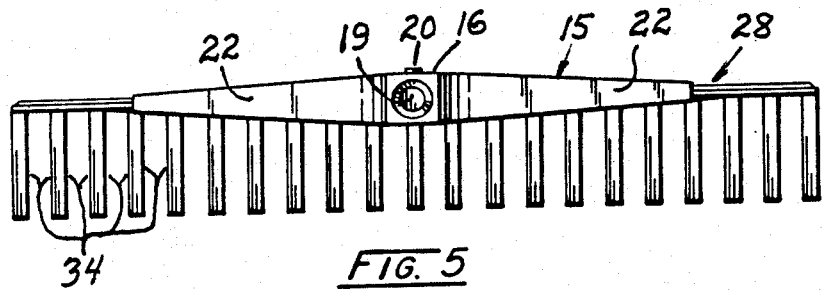
FIG. 5 is an end elevational view looking toward the handle-receiving socket of the rake head.

The intermediate, fan-shaped portion 18 of the frame is formed with a comparatively thin, planar base wall or panel 21 bounded along its marginal edges with perpendicular related edge flanges 22 and formed in its central area with a series of relatively spaced apart, longitudinally extending stiffening ribs 23. The ribs 23 project outwardly from the opposite faces of the base panel 21 and merge with a transverse rib or flange 24 formed at the juncture of the intermediate portion with the relatively wider outer end portion 17 of the frame. On the under face (FIG. 4) of the rake head, the marginal flanges 22 and stiffening ribs 23 merge with corresponding flanges 25 and reinforcing ribs 26 formed on the narrower, socket end section 16. On its upper face (FIG. 1) the flanges 22 and reinforcing ribs 23 merg with a flat plate-like panel 27 which may advantageously be used to display indicia, not shown, identifying the country of origin, model number, etc. of the rake head.

In addition to the fan-shaped frame section 15, the rake head also comprises an integrally molded tine section indicated generally by reference numeral 28. The tine section 28 of the rake head is composed of a second, thermoplastic, synthetic resin, such as ABS (terpolymer, acrylonitrile-butadiene-styrene), or a polycarbonate resin (Lexan), having substantially greater strength and wear-resistance than the synthetic resin from which the frame section 15 is formed. Preferably, the resin from which the tine section 28 is formed is colored or pigmented to provide a color contrasting with that of the frame section 15, thus providing an attractive, decorative appearance for the rake head and adding substantially to its eye appeal.

As will be readily understood by those skilled in the art of injection molding, the present rake head may be formed by utilizing a conventional, two-stage, insert molding procedure in which the frame section 15 of the rake head is first formed in a molding chamber of desired configuration and thereafter the tine section 28 is injection molded in an adjacent molding cavity which is in communication with the wider, outer end portion of the previously molded frame section 15.

Toward this end, the wider end portion 17 of the frame 15 is formed to include a multiplicity of longitudinally disposed, relatively spaced apart, outwardly opening sprue channels 29 and a transversely extending, common manifold chamber 30 which intersects the sprue channels 29 intermediate their ends (see FIGS. 6–8). The common manifold chamber 30 extends transversely for substantially the entire width of the wider end portion 17 of the frame 15 and is in direct communication with an open, coextensive slot 31 formed in the under face of the frame (see FIGS. 4 and 6). The manifold chamber 30 also communicates with a plurality of relatively spaced apart gate openings 32 formed in the opposite, upper face of the frame.

The tine section 28 is formed to include an anchoring, root portion 33 and a multiplicity of elongated, resiliently flexible tines 34 radiating outwardly from the outer end portion 17 of the frame. The root portion 33 of the tine section includes a transversely extending rib or flange 35 which adjoins the roots of the tines 34 along the wider, outer end portion 17 of the frame section 15. The root portion 33 further includes a continuous, transverse runner 36 which fills the transverse manifold chamber 30 and which connects a plurality of relatively spaced apart, longitudinally extending runners 37 which occupy the sprue channels 29.

As will be seen in FIG. 6 of the drawings, the root portion 33 of the tine section 28 also includes a plurality of integrally formed lateral projections 38 and 39 which extend laterally outwardly through the slot 31 and gates 32, respectively, of the frame section and which function to interlock the root portion 33 of the tine section 28 within the upper end portion 17 of the frame section 15. Also, if desired, the lateral projections or formations 39 may include relatively enlarged head portions 40 in the shape of alphabetical letters or other indicia which may form a trademark for the rake head. The relatively enlarged head portions 40 of the lateral projections 39 are easily molded into desired letter-forming indicia by inserting an appropriately shaped mold plate or insert into the molding cavity during the second stage injection molding of the tine section 28 of the rake head.

The tines 34 are preferably formed on their upper surfaces with integral, longitudinally coextensive stiffening ribs 42, and relatively widened root portions 43 adjacent the transverse base web 35. Also, the root portions 43 of the tines 34 may be additionally strengthened and reinforced by tapered ribs 44 formed on their under surfaces (see FIG. 9).

Each of the tines 34 terminates in an angularly bent tip or finger portion 45 whose length dimension ranges from one-fourth to one-third of the overall length of the tine. This unusually long length of working finger greatly increases the longevity and useful life of the rake head, since it is the fingers or tips of the tines which are subjected to continuous frictional wear during normal usage of the lawn rake.

Further, the unusually large length dimension of the tips or finger portions 45 of the tines is believed to contribute to what has been observed as a self-cleaning action on the part of the tines. In this regard, it has been observed that as the tines 34 of the rake head are moved across the ground surface in normal raking action they tend to vibrate in non-cyclic fashion with the result that the out of phase vibration of the tines tends to remove leafs which have become impaled on the fingers 45 of the tines. Further, the ABS resin from which the tines are formed has a comparatively low coefficient of friction and a high degree of lubricity which also aids in the separation of impaled leafs from the outer finger portions of the tines.

The use of polypropylene or other comparative low modulus, inexpensive synthetic resin in the formation of the frame section of the rake head substantially reduces the overall cost of the rake head as contrasted to one formed entirely from a more costly, high strength resin, such as the ABS or polycarbonate resins. At the same time, the use of the more expensive, high strength resins in the formation of the tine section of the rake head greatly improves the mechanical action of the tines and the longevity of the overall rake head.

By utilizing different synthetic resins for the frame and tine sections of the rake head, each section may be formed throughout with a color contrasting with that of the other section, thus providing a highly decorative and novel, eyepleasing appearance for the overall rake head. For example, the visable portions of the tine section, namely: the tines themselves, the exterior adjoining rib 35 and the indicia providing projections 40 may be formed with a grey coloration, while the frame section may be pigmented throughout to provide a contrasting green, black, or red color. The contrasting colors of the frame and tine section greatly increases the sales appeal of the rake head as compared with that of a unicolored molded plastic rake head.

While a single perferred embodiment of this invention has been illustrated and described in detail, it should be understood that various modifications as to details of construction and design may be resorted to without departing from the spirit of the invention or the scope of the following claims.

I claim:

1. A lawn rake head comprising:
    (a) an integrally molded, generally fan-shaped frame section composed of a first, selected synthetic resin and having:
        (i) a narrower end portion formed with handle-connecting means;
        (ii) an opposite, wider end portion formed with a multiplicity of longitudinally disposed, relatively spaced apart, outwardly opening sprue channels connected by a common, transversely disposed manifold chamber;
        (iii) a longitudinally tapered, thin-walled intermediate portion extending between and connecting the end portions of said frame section and having a series of longitudinally extending stiffening ribs projecting outwardly from opposite faces thereof; and
    (b) an integrally molded tine section composed of a second, comparatively tougher, more wear-resistant synthetic resin than said first selected synthetic resin and having:
        (iv) a root portion molded in and occupying the sprue channels and manifold chamber of said frame section; and
        (v) a multiplicity of elongated, resiliently flexible tines integrally connected with the root portion and extending longitudinally outwardly from the wider end portion of said frame section.

2. A lawn rake head according to claim 1, wherein the manifold chamber of the wider end portion of said frame section includes a plurality of lateral passages opening on opposite faces of said frame section, and wherein the root portion of said tine section includes a plurality of integral, lateral projections extending through said lateral passages and interlocking said tine section with said frame section.

3. A lawn rake head according to claim 1, wherein each of the flexible tines terminates in an angularly bent finger whose length dimension is at least one-fourth that of the overall length of the tine.

4. A lawn rake according to claim 1, wherein the wider end portion of said frame section is formed with a plurality of relatively separated gates communicating with said manifold chamber and opening toward an outer face of said frame section, and wherein the root portion of said tine section includes a plurality of relatively spaced apart formations extending laterally outwardly through said gates onto said outer face of said frame section and providing a lateral interlock between the root portion of the tine section and said frame section.

5. A lawn rake head according to claim 1, wherein said first, selected synthetic resin is polypropylene and said second synthetic resin is an ABS resin.

* * * * *